United States Patent [19]
Kanome et al.
[11] Patent Number: 4,952,942
[45] Date of Patent: Aug. 28, 1990

[54] INK JET RECORDING METHOD WITH IMPROVED TONE BY RECORDING YELLOW FIRST

[75] Inventors: Rieko Kanome, Kawasaki; Eiichi Suzuki, Tokyo, both of Japan

[73] Assignee: Canon Kabushiki Kaisha, Tokyo, Japan

[21] Appl. No.: 327,398

[22] Filed: Mar. 22, 1989

Related U.S. Application Data

[63] Continuation-in-part of Ser. No. 54,515, May 27, 1987, abandoned.

[30] Foreign Application Priority Data

May 29, 1986 [JP] Japan ............................... 61-122122

[51] Int. Cl.[5] .......................... G01D 15/16; B41J 3/04

[52] U.S. Cl. ................................ 346/1.1; 346/140 R; 358/75

[58] Field of Search ................... 346/140, 1.1; 358/75, 358/80

[56] References Cited

U.S. PATENT DOCUMENTS

| | | | |
|---|---|---|---|
| 3,404,221 | 10/1968 | Loughren . | |
| 3,475,874 | 11/1969 | Loughren . | |
| 4,403,874 | 9/1983 | Payne et al. . | |
| 4,492,965 | 1/1985 | Ohnishi et al. . | |
| 4,528,576 | 7/1985 | Koumura | 346/140 |
| 4,533,920 | 8/1985 | Suzuki | 346/140 X |
| 4,533,923 | 8/1985 | Suzuki | 346/1.1 |
| 4,540,996 | 9/1985 | Saito | 346/140 R |
| 4,551,736 | 11/1985 | Suzuki | 346/140 R |
| 4,560,997 | 12/1985 | Sato et al. | 346/140 R |
| 4,593,295 | 6/1986 | Matsufuji | 346/140 |
| 4,595,931 | 6/1986 | Toganoh | 346/140 X |
| 4,604,654 | 8/1986 | Sakurada et al. | 358/298 |
| 4,631,578 | 12/1986 | Sasaki et al. . | |
| 4,635,078 | 1/1987 | Sakurada et al. | 346/140 R |
| 4,672,432 | 6/1987 | Sakurada et al. | 358/75 |
| 4,686,538 | 8/1987 | Kouzato | 346/1.1 |
| 4,692,773 | 9/1987 | Saito et al. | 346/1.1 |
| 4,695,846 | 9/1987 | Suzuki | 346/1.1 |
| 4,713,701 | 12/1987 | Kawamura et al. | 358/298 |
| 4,713,746 | 12/1987 | Watanabe et al. | 346/1.1 |
| 4,714,964 | 12/1987 | Sasaki | 358/298 |
| 4,727,436 | 2/1988 | Kawamura et al. | 358/298 |
| 4,772,911 | 9/1988 | Sasaki et al. | 346/140 R |
| 5,494,128 | 1/1985 | Vaught | 346/140 R |

FOREIGN PATENT DOCUMENTS

| | | |
|---|---|---|
| 52-11712 | of 1977 | Japan . |
| 53-102034 | of 1978 | Japan . |
| 57-156264 | of 1982 | Japan . |

*Primary Examiner*—Joseph W. Hartary
*Attorney, Agent, or Firm*—Fitzpatrick, Cella, Harper & Scinto

[57] ABSTRACT

An ink jet recording method comprises using inks of two or more colors including yellow and forming a mixed color portion containing yellow on a recording medium by use of a plurality of inks with different dye concentrations for at least one color, wherein the yellow ink is attached onto the recording medium always prior to attachment of other inks thereonto.

2 Claims, 2 Drawing Sheets

INK JET RECORDING METHOD WITH IMPROVED TONE BY RECORDING YELLOW FIRST

This application is a continuation-in-part of application Ser. No. 054,515, filed May 27, 1987, now abandoned.

BACKGROUND OF THE INVENTION

1. Field of the Invention

This invention relates to an ink jet recording method for forming a full color image by use of two or more recording liquids (inks) with different colors including yellow, and more particularly to an ink jet recording method capable of forming a full color image having a broad color reproduction range and an abundant gradation characteristic and having good image stability, and also suitable for high speed recording.

2. Related Background Art

The ink jet recording method is a recording method in which recording is performed by generating small droplets of ink according to various ink discharging systems such as (1) the electrostatic attracting system by high voltage application, (2) the system in which mechanical vibration or displacement is applied to the ink by use of a piezoelectric element, (3) the system in which ink is momentarily foamed by heating and its pressure upon foaming is utilized, etc., and attaching such droplets onto a recording medium such as paper, etc.

The full-color recording is effected by subjecting the three colors of yellow (Y), magenta (M), and cyan (C), or four colors with black (K) added thereto to subtractive mixing of colors. Namely, full-color recording is effected by discharging the three colored inks or four colored inks with black (K) added thereto from nozzles used exclusively for the respective colors of the recording head while the respective amounts of the colored inks to be discharged are being controlled, and by allowing the respective inks to be mixed and absorbed by each picture element of the recording material.

For instance, in a conventional printer in which cylindrical piezoelectric elements are used in a printer head of an ink jet system, the gradations of density can be expressed by ink dot diameter modulation method in which the diameter of the dots to be printed on the recording sheet is modulated.

Meanwhile, since the ratio of change between a maximum dot and a minimum dot is not very large, there are cases where areas lack a sufficient density to output a natural color image. Accordingly, a low-density ink and a high-density ink both of the same color are prepared for each color, and the high- and low-density inks are selectively used by changing over the heads in accordance with the high- and low-density areas, thereby securing areas having necessary densities, as disclosed in, for example, U.S. Pat. Nos. 4,551,736, 4,533,920, 4,533,923 and 4,695,846. A method employing such high- and low-density inks for each color is hereinafter referred to as an ink density variation method.

However, when the formation of an image is carried out according to such an ink density variation method or an ink dot diameter modulation method, there occurs the phenomenon that particularly a skin color portion (a mixed color portion comprising yellow, magenta and cyan, i.e., highlight area) becomes yellow with the lapse of time.

This phenomenon, different from discoloration and fading phenomenon over a long time which is considered to occur owing to dyes contained in an ink, is a change in tone with the lapse of time in a short time scale. This phenomenon results in disintegration of the initial balance of an image and becomes a bar with respect to obtaining a full color image of high quality.

In addition, at a middle area, an image with clear tone and high contrast has not been obtained.

SUMMARY OF THE INVENTION

The present invention has been accomplished in order to solve problems posed in forming an image by such an ink dot diameter modulation method or an ink density variation method, and its object is to provide an ink jet recording method which can control effectively the change with lapse of time in tone of the full color image as described above and can be sufficiently applied for high speed recording. Another object of the present invention is to provide an ink jet recording method which is excellent in color reproducibility from a highlight area to a middle area.

A further object of the present invention is to provide an ink jet recording method capable of forming a full color image having a broad color reproduction range and an abundant gradation characteristic, and also having good image stability.

The above objects can be accomplished by the present invention as described below.

The present invention provides an ink jet recording method, which comprises using inks of two or more colors including yellow and forming a mixed color portion containing yellow on a recording medium by use of a plurality of inks with different dye concentrations for at least one color, wherein the yellow ink is attached onto the recording medium always prior to attachment of other inks thereonto.

There is also provided an ink jet recording method, which comprises using inks of two or more colors including yellow and forming a mixed color portion containing yellow on a recording medium by use of a plurality of inks with different dye concentrations for at least one color, wherein the yellow ink is attached onto the recording medium always prior to attachment of other inks thereonto by use of a recording head having an arrangement so that ejecting nozzles for yellow ink can pass over the recording medium on which the mixed color portion is formed always prior to passage of the ejecting nozzles of other inks thereover.

There is also provided an ink jet recording method, which comprises using inks of two or more colors including yellow and forming a mixed color portion containing yellow on a recording medium by use of a plurality of inks with different dye concentrations for at least one color, wherein the yellow ink is attached onto the recording medium always prior to attachment of other inks by use of a recording head having a plural number of ejecting nozzles which are arranged in a line along the printing direction, and at both ends of which ejecting nozzles for yellow ink are arranged.

There is also provided an ink jet recording method, which comprises using inks of two or more colors including yellow and forming a mixed color portion containing yellow on a recording medium by use of a plurality of inks with different dye concentrations for at least one color, wherein the yellow ink is attached onto the recording medium always prior to attachment of other inks thereonto by use of a recording head in which the ejecting nozzles for yellow ink are arranged rearward at a predetermined distance from the ejecting nozzles for other inks with respect to the delivery direction of the recording medium.

DETAILED DESCRIPTION OF THE PREFERRED EMBODIMENTS

Figure 1:
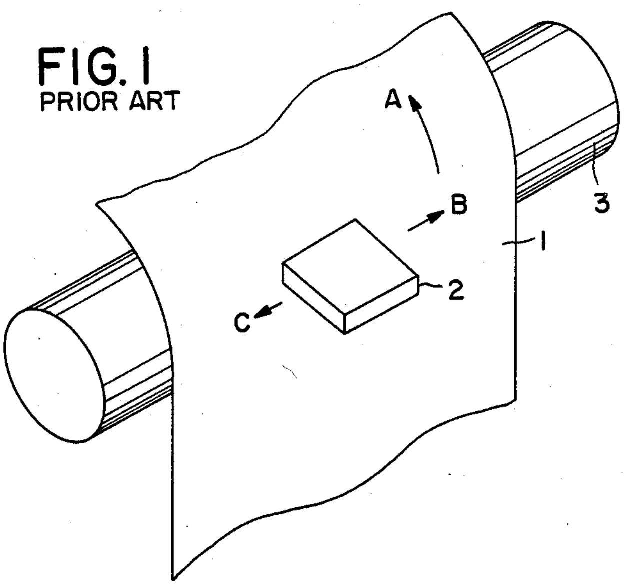
FIG. 1 PRIOR ART
FIG. 1 is a schematic perspective view showing a movement system of a recording head and a recording medium.

The present inventors have made various investigations about the change with lapse of time in tone of the image as described above in the ink jet recording method, and consequently confirmed that among the mixed color portions in which two or more inks with different colors are superposed on one another, the change with lapse of time in tone is remarkable in the mixed color portion (highlight area) containing (highlight area) yellow such as skin color, etc., obtained by mixing of colors, for example, yellow, magenta and cyan, and also that the change in tone occurs by shifting of the hue of the three properties of color (brightness, chroma, hue) at the mixed color portion to the yellow side. The mixed color portion as mentioned in the present invention refers to the portion in which two or more ink droplets of inks with different colors are attached overlappingly.

Accordingly, the present inventors have studied intensively the method for controlling the phenomenon in which the tone of yellow is intensified at the mixed color portion, and unexpectedly found that the change with lapse of time in tone of the image as mentioned above can be controlled effectively by practicing recording with yellow ink at the mixed color portion always prior to recording with inks of other colors.

More specifically, in the ink jet recording method, the reason that the change with lapse of time in tone at the mixed color portion containing yellow is marked may be estimated probably as follows.

$(D_y/D_{Mn})$ or $D_y/D_{Cn}) < 1$ wherein y denotes yellow ink, Mn denotes magenta ink of low dye concentration and Cn denotes cyan ink of low dye concentration.

At the mixed portion which is formed with ink droplets with different colors, since liquid droplets of inks of two or more kinds are attached at the same side in the order corresponding to the constitution of the recording head, the quantity of a solvent for inks in one image element is varied. Additionally, another ink is attached on the ink droplet previously attached on the recording medium before the solvent component is not absorbed completely into the recording medium, whereby the ink droplet attached later is necessarily liable to be spread to the outside as compared with the ink droplets previously attached, thus generating readily the so called swimming of ink. Further, even after recording, since the solvent component of the ink is not necessarily quick-drying, dyes may be migrated through the chromatographic phenomenon in which the solvent component acts as the so called developing agent. Whereas, conventional yellow dyes used for formation of inks for ink jet recording are unexpectedly most liable to give rise to such movements as compared with the dyes of other colors, and consequently if yellow ink is attached after other inks, the yellow ink is spread outside of the previous ink dots attached, and the area of the yellow portion is expanded to be greater than the dots of other colors with the lapse of time, whereby the tone of yellow at the mixed color portion containing yellow may be estimated to appear more intense than is necessary.

Therefore, by performing recording with yellow always prior to recording with inks of other colors, namely attaching yellow ink droplets prior to attachment of inks of other colors, in the lapse of time until drying and fixing of the image, movements of yellow ink and other inks can be harmonized on the recording medium, and the good balance of colors immediately after recording can be prevented from being greatly disintegrated.

Accordingly, in the method of the present invention, upon recording a mixed portion formed by use of inks of two or more colors containing yellow, recording with yellow is performed always prior to recording with other colors. The present inventors have found that, to obtain an image which is clear in tone at a middle area, the ratio of the high dye concentration yellow ink to the low dye concentration magenta or cyan ink should be adjusted at a predetermined value or more. That is, the relationship between the dye concentration of the yellow ink of a high dye concentration and that of the magenta ink or cyan ink of a low dye concentration should satisfy the following formula: $(A_y/A_{Mn})$ or $(A_y/A_{Cn}) \geqq 3$ wherein y denotes a yellow ink, Mn denotes a magenta ink of low dye concentration and Cn denotes a cyan ink of low dye concentration. If the formula is satisfied, an image which is clear in tone at a middle area will be obtained. When the ratio is 3.5 or more, an particularly preferred image will be obtained.

When the ratio is less than 3, the middle area becomes, as a whole, shallow in tone, merely affording an image with low contrast.

Thus, according to the ink jet recording method of the present invention, there can be obtained an image which is clear in tone from a highlight area to a middle area and of which tone does not change with the lapse of time.

Moreover, in the recording method of the present invention, since a device equipped with a recording head having a structure capable of performing such recording efficiently is used as the ink jet recording device, high speed recording can be easily practiced while controlling the change in tone as described above. That is, in the method of the present invention, a recording head is used having a plurality of ejecting orifices for recording liquid arranged at a positional relationship corresponding to the movement of the recording head so that yellow can be recorded always prior to recording of other colors.

Figure 2:
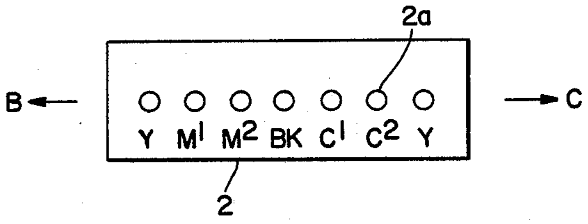
FIG. 2 and FIG. 3 illustrate arrangements of ink ejecting orifices of the ink jet recording head suitably used for the method of the present invention.
Figure 3:
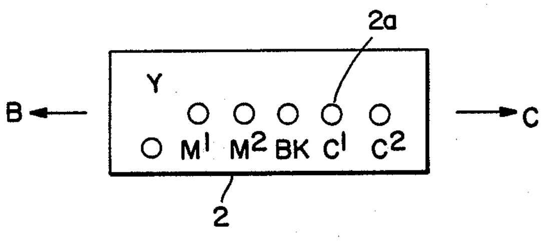

As such an arrangement of ejecting orifices, for example, for the moving system of the recording head as shown in FIG. 1, namely the system in which recording is successively performed by delivering the recording medium 1 at predetermined pitch with a platen 3 upwardly (arrowhead A) each time when the recording head 2 is reciprocated in the vertical directions (arrowheads B, C) relative to the delivering direction (arrowhead A) of the recording medium 1, the ejecting orifice arrangements as shown in FIG. 2 and FIG. 3 can be applied.

The recording head in FIG. 2 has a structure in which along the direction vertical to the delivering direction (arrowhead A) of the recording medium, the ejecting orifices 2a for Y, yellow ink; $M^1$, magenta ink (low dye concentration); $M^2$, magenta ink (medium dye concentration); $C^1$, cyan ink (low dye concentration); Bk, black ink; $C^2$, cyan ink (high concentration); and Y, yellow ink are respectively arranged from the left, and in both the going way (e.g. the direction of the arrowhead B) and the returning way (e.g. the direction of the arrowhead C), recording is successively performed by discharging of inks.

By use of a recording head with such a constitution, in both the going way and the returning way of movement of the recording head, the ejecting orifices (Y) of yellow ink are positioned always in advance of ejecting orifices of other colors, namely over the portion where a mixed color portion including yellow should be formed, the ejecting orifice (Y) for yellow ink is designed to pass always prior to passage of ejecting orifices for other inks thereover, whereby recording with yellow ink can be practiced always prior to recording with other inks. Moreover, since recording is performed in both the going way and the returning way, higher speed recording can be realized as compared with the case in which recording is practiced only in the going way.

On the other hand, in the recording head in FIG. 3, there is employed an arrangement in which the ejecting orifice (Y) for yellow ink is provided below the ejecting orifices for other colors with a distance corresponding to the delivery pitch of the recording medium.

With such constitution, at the unrecorded portion of the recording medium which has moved below the moving path of the ejecting orifice (Y) of the recording head, first recording only with yellow is practiced in the going way (or the returning way) of the recording head. Next, when the recording medium is delivered for one pitch, the portion previously recorded with a yellow ink, is sent below the moving path where an arrangement of ejecting orifices for other color inks is moved, and below the moving path of ejecting orifice (Y), the unrecorded portion of the recording medium comes to be newly moved. Accordingly, when the recording head is moved back, namely in the returning way (or the going way), recording with other colors is practiced at the portion where recording was effected previously with a yellow ink, and also at the unrecorded portion of the recording medium which has newly come to be moved below the recording head, recording with a yellow ink is practiced. Also, in this recording head, over the portion at which a mixed color portion including yellow is to be formed, the ejecting orifice (Y) for yellow ink is designed to be passed always prior to passage of the ejecting orifices for other ink thereover, whereby recording with yellow can be practiced always prior to recording with other colors and reciprocal recording enables realization of high speed recording.

The movement system of the recording head and the recording medium is not limited to examples as described above, but it can be determined and selected depending on various recording systems.

The present invention is described in more detail by referring to the following Examples.

EXAMPLE 1

Recording of a full color image was practiced on a paper for ink jet recording (Mitsubishi Ink Jet Recording Paper IJ-MC, Mitsubishi Paper Mills, Ltd.) by use of an on-demand type ink jet recording device which is equipped with a recording head having seven ejecting nozzles arranged in a line along the moving direction of a recording head (which is driven by a piezo-oscillator) at intervals of 5.0 mm as shown in FIG. 2 and performs recording by the same actuation as described with reference to FIG. 1, according to the recording method of the present invention with the use of a video disc picture face as the original picture.

As the inks, those with the following compositions were employed. Further, the delivery pitch of recording medium was controlled so that the recording head was moved upward 0.2 mm at the time of recording being completed in the going or returning way. Driving voltages were controlled so that the dot diameter of yellow ink may become 130 μm, that of magenta ink $M^1$ (low density concentration) 172 μm and that of cyan ink $C^1$ (low density concentration 160 μm.

| | Parts by weight |
|---|---|
| Yellow ink; Y | |
| C.I. Acid Yellow 23 | 1.0 |
| Diethylene glycol | 50 |
| Water | 50 |
| Magenta ink; $M^1$ | |
| C.I. Acid Red 35 | 0.5 |
| Diethylene glycol | 50 |
| Water | 50 |
| Magenta ink; $M^2$ | |
| C.I. Acid Red 35 | 1.0 |
| Diethylene glycol | 50 |
| Water | 50 |
| Cyan ink; $C^1$ | |
| C.I. Direct Blue 199 | 0.2 |
| Diethylene glycol | 50 |
| Water | 50 |
| Cyan ink; | |
| C.I. Direct Blue 199 | 1.0 |
| Diethylene glycol | 50 |
| Water | 50 |
| Black; Bk | |
| C.I. Food Black 2 | 2.0 |
| Diethylene glycol | 45 |
| Water | 55 |

The full color image thus obtained was found to be a high quality image which was clear and in which the density gradation of the original picture was faithfully expressed. The time required for recording was about 3 minutes. From this image, as representative of the mixed color portion containing yellow, the skin color portion comprising the mixed color portion of magenta, yellow and cyan was selected, and the change in tone at that portion when the image was left to stand at room temperature was measured as the change in color difference of L*a*b* color specification system. (ΔE*) following the lapse of standing time, based on the tone immediately after recording. An image obtained at a middle area was also found to be clear in tone. Colorent was conducted by color back system by use of a spectrophotometer UV-240 (produced by Simazu Seisakusho).

Figure 5:
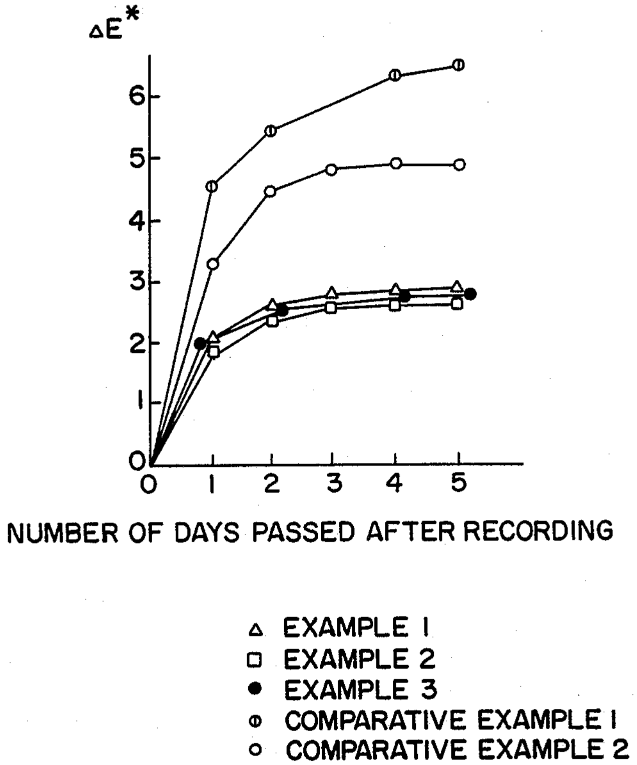
FIG. 5 is a graph showing the changes in color difference ($\Delta E^*$) from a moment immediately after recording at the respective skin color portions of the recorded images obtained in Examples 1–3 and Comparative examples 1 and 2.

The change with lapse of time in the color difference (ΔE*) at the skin color portion is shown in FIG. 5.

The color difference (ΔE*) at the skin color portion was slightly increased immediately after recording with lapse of time. However, the color difference was about 3 after 5 days, and the change in tone could not be confirmed by observation with eyes.

EXAMPLE 2

Except for using an ink jet recording device equipped with a recording head having an arrangement of ejecting orifices for inks as shown in FIG. 3, formation of a full color image was practiced in the same manner as in Example 1.

The full color image thus obtained was also a high quality image which was clear and in which the density gradation of the original picture was faithfully expressed. The time required for recording was about 3 minutes. From this image, the change with lapse of time in the tone at the same skin color portion as selected in Example 1 was measured as the change in color difference (ΔE*) similarly as in Example 1 and the result was shown in FIG. 5.

Also, the color difference (ΔE*) at the skin color portion was only slightly increased immediately after recording with lapse of time similarly as in Example 1, with the color difference being about 3 after 5 days, and the change in tone could not be confirmed by observation with eyes.

EXAMPLE 3

Figure 4:
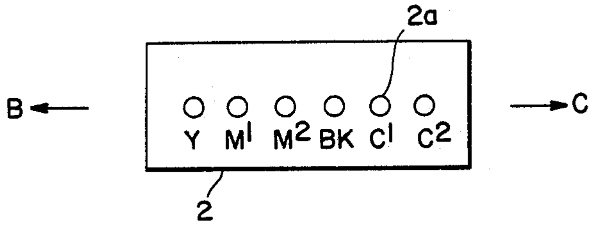
FIG. 4 PRIOR ART
FIG. 4 illustrates an arrangement of the ink ejecting orifices of the ink jet recording head of the prior art.

Except for using an ink jet recording device equipped with a recording head having an arrangment of ejecting orifices for inks as shown in FIG. 4 and performing recording only in one way in the direction of the arrowhead B, formation of full color image was practiced in the same manner as in Example 1.

The full color image thus obtained was also a high quality image which was clear and in which the density gradation of the original picture was faithfully expressed, and the time required for recording was about 6 minutes. From this image, the change with lapse of time in tone at the same skin color portion as selected in Example 1 was measured as the change in color difference (ΔE*) similarly as in Example 1 and the result are shown in FIG. 5.

The change in color difference (ΔE*) at the skin color portion was slight, similarly to Example 1.

COMPARATIVE EXAMPLE 1

Except for using an ink jet recording device equipped with a recording head having an arrangement of ejecting orifices for inks as shown in FIG. 4 and performing recording only in one way in the direction of the arrowhead C, formation of a full color image was practiced in the same manner as in Example 1. The time required for this recording was about 6 minutes.

The full color image thus obtained was also a high quality image which was clear and in which the density gradation of the original picture was faithfully expressed, but the change in color difference (ΔE*) relative to that immediately after recording at the same skin color portion as selected in Example 1 measured in the same manner as in Example 1 was increased with lapse of time immediately after recording as shown in FIG. 5, and the color difference became very great, about 6.5 after 5 days, and the change in tone could be remarkably confirmed even by observation with eyes. Moreover, the image became disintegrated from good balance immediately after recording.

COMPARATIVE EXAMPLE 2

Except for using an ink jet recording device equipped with a recording head having an arrangement of ejecting orifices for inks as shown FIG. 4, formation of a full color image was practiced in the same manner as in Example 1. The time required for recording was about 3 minutes.

The full color image thus obtained was also a high quality image which was clear and in which the density gradation of the original picture was faithfully expressed. However, the change in color difference (ΔE*) relative to that immediately after recording at the same skin color portion as selected in Example 1 measured similarly as in Example 1 was increased immediately after recording with lapse of time as shown in FIG. 5, and the color difference became great as about 5.0 after 5 days, and the change in tone could be remarkably confirmed even by observation with eyes. Moreover, the image became disintegrated from good valance immediately after recording.

COMPARATIVE EXAMPLE 3

A full color recording was conducted in the same manner as in Example 1, except that 0.5 wt% of a low dye concentration magenta ink M and 0.5 wt% of a low dye concentration cyan ink $C^1$ were used.

As a result, the color difference (ΔE*) was similar to that in Example 1. However, the image at the middle area was shallow in tone and unclear.

[EFFECT OF THE INVENTION]

In the method of the present invention, upon recording of a mixed color portion formed with the use of inks of two colors or more including yellow, recording with yellow is always performed prior to recording of other colors, and an ink jet recording device equipped with a recording head having a structure capable of performing efficiently such recording is also used, and therefore it is possible to form a full color image having a broad color reproduction range and an abundant gradation characteristic, and also having good image stability in high speed recording.

We claim:

1. An ink jet recording method, which comprises the steps of:

using a yellow ink, a cyan ink and a magenta ink, provided that at least one of the yellow and cyan inks is provided in a plurality of dye concentrations;

modulating the diameters of dots of the inks; and forming a mixed color portion on a recording medium, wherein the relationships between the diameters of ink dots (D μm) and that between the dye concentrations of inks (A wt%) satisfy the formulae:

$$(D_y/D_{Mn}) \text{ or } (D_y/D_{Cn})<1 \text{ and } (A_y/A_{Mn}) \text{ or } (a_y/A_{Cn})\geqq 3$$

wherein Y denotes yellow ink, Mn denotes magenta ink of low dye concentration and Cn denotes cyan ink of low concentration, and the yellow ink is attached on the recording medium prior to the attachment of other color inks thereon.

2. An ink jet recording method according to claim 1, wherein the relationship between the dye concentration of inks (A) satisfies the following formula:

$$(A_y/A_{Mn}) \text{ or } (A_y/A_{Cn})>3.5.$$

* * * * *

UNITED STATES PATENT AND TRADEMARK OFFICE

CERTIFICATE OF CORRECTION

PATENT NO. : 4,952,942

DATED : August 28, 1990

INVENTOR(S) : RIEKO KANOME ET AL.

It is certified that error appears in the above-identified patent and that said Letters Patent is hereby corrected as shown below:

ON THE TITLE PAGE,

AT [56] REFERENCES CITED

U.S. Patent Documents, "5,494,128 1/1985 Vaught" should read--4,494,128 1/1985 Vaught-- and "3,475,874 11/1969 Loughren" should read --3,476,874 11/1969 Loughren--.

COLUMN 1

Line 46, "by ink" should read --by an ink--.

COLUMN 2

Line 19, "recording. Another" should read --recording. ¶ Another--.

UNITED STATES PATENT AND TRADEMARK OFFICE

CERTIFICATE OF CORRECTION

PATENT NO. : 4,952,942

DATED : August 28, 1990

INVENTOR(S) : RIEKO KANOME ET AL.

It is certified that error appears in the above-identified patent and that said Letters Patent is hereby corrected as shown below:

COLUMN 3

Line 30, "(high-" should be deleted.
Line 31, "light area)" should be deleted.
Line 51, insert --In the ink jet recording method employing high and low density inks, to form the highlight area, such as a skin color portion, of an image or to reproduce an original accurately, it is necessary to use the small dots of a yellow ink of a high dye concentration which is 0.5 to 1.0 wt% based on a liquid medium, the large dots of a magenta ink of a low dye concentration which is 0.1 to 0.5 wt% based thereon, and the small dots of a cyan ink of a low dye concentration which is 0.1 to 0.5 wt% based thereon.

With respect to ink dot diameters, the following formulae should be satisfied:--.

Line 52, "$D_y/D_{cn})<1$" should read --$(D_y/D_{cn})<1$--.
Line 66, "so called" should read --so-called--.

COLUMN 4

Line 3, "so called" should read --so-called--.
Line 40, "an" should read --a--.

UNITED STATES PATENT AND TRADEMARK OFFICE
CERTIFICATE OF CORRECTION

PATENT NO. : 4,952,942

DATED : August 28, 1990

INVENTOR(S) : RIEKO KANOME ET AL.

It is certified that error appears in the above-identified patent and that said Letters Patent is hereby corrected as shown below:

COLUMN 6

Line 23, "yellow ink" should read --yellow ink Y--.
Line 25, "concentration 160 μm." should read --concentration) 160 μm.--.
Line 43, "Cyan ink;" should read --Cyan ink; $C^2$--.
Line 65, "Colorent" should read --Color measurement--.

COLUMN 7

Line 44, "result" should read --results--.

COLUMN 8

Line 19, "valance" should read --balance--.
Line 56, "$(a_Y/A_{Cn})\geqq 3$" should read --$(A_Y/A_{Cn})\geqq 3$--.
Line 59, "low concentration," should read --low dye concentration,--.

Signed and Sealed this

Third Day of March, 1992

Attest:

HARRY F. MANBECK, JR.

*Attesting Officer* *Commissioner of Patents and Trademarks*